Jan. 27, 1948.   J. G. THOMPSON   2,435,059
GRINDING MACHINE
Filed July 20, 1945   8 Sheets-Sheet 6

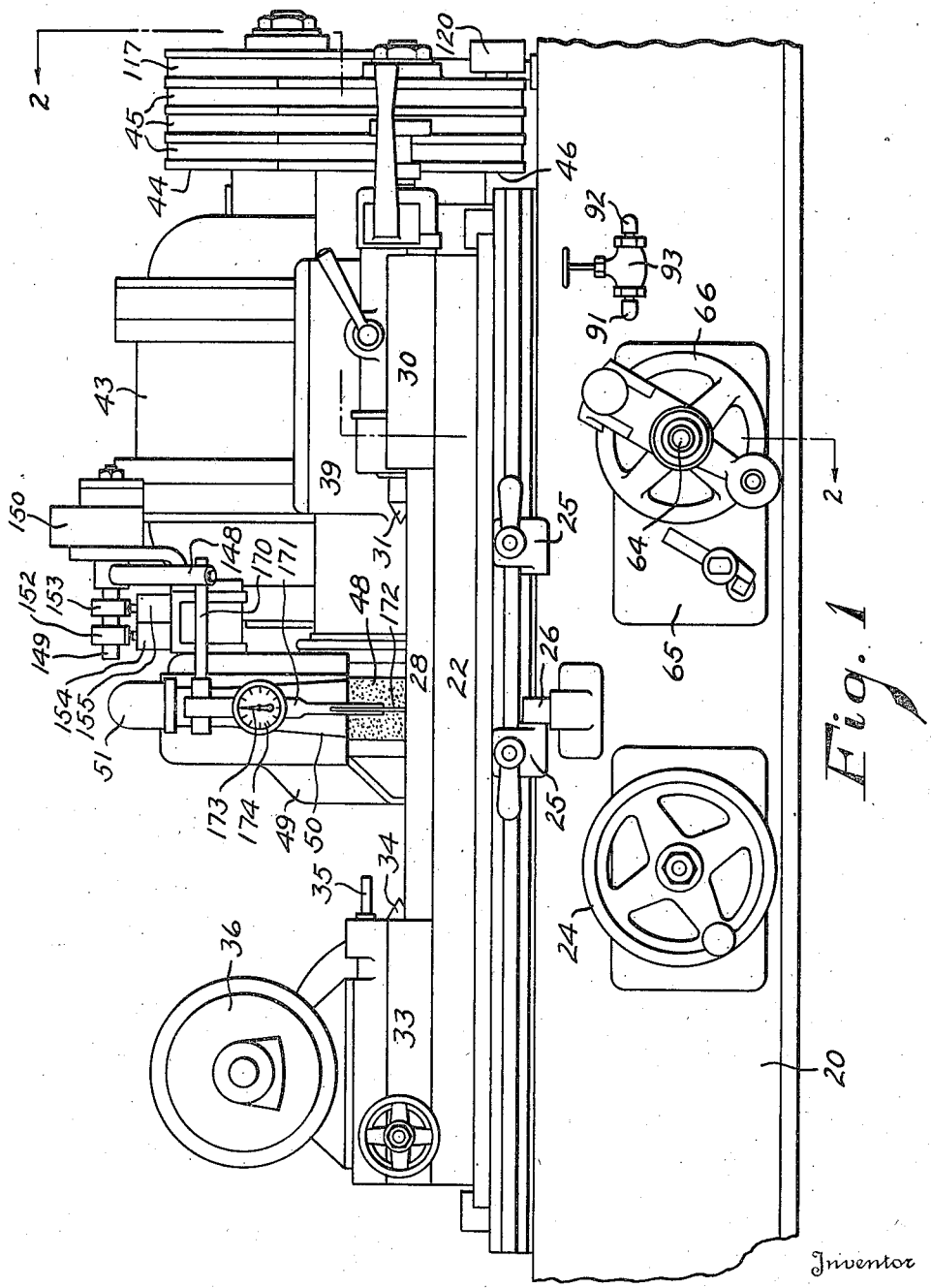

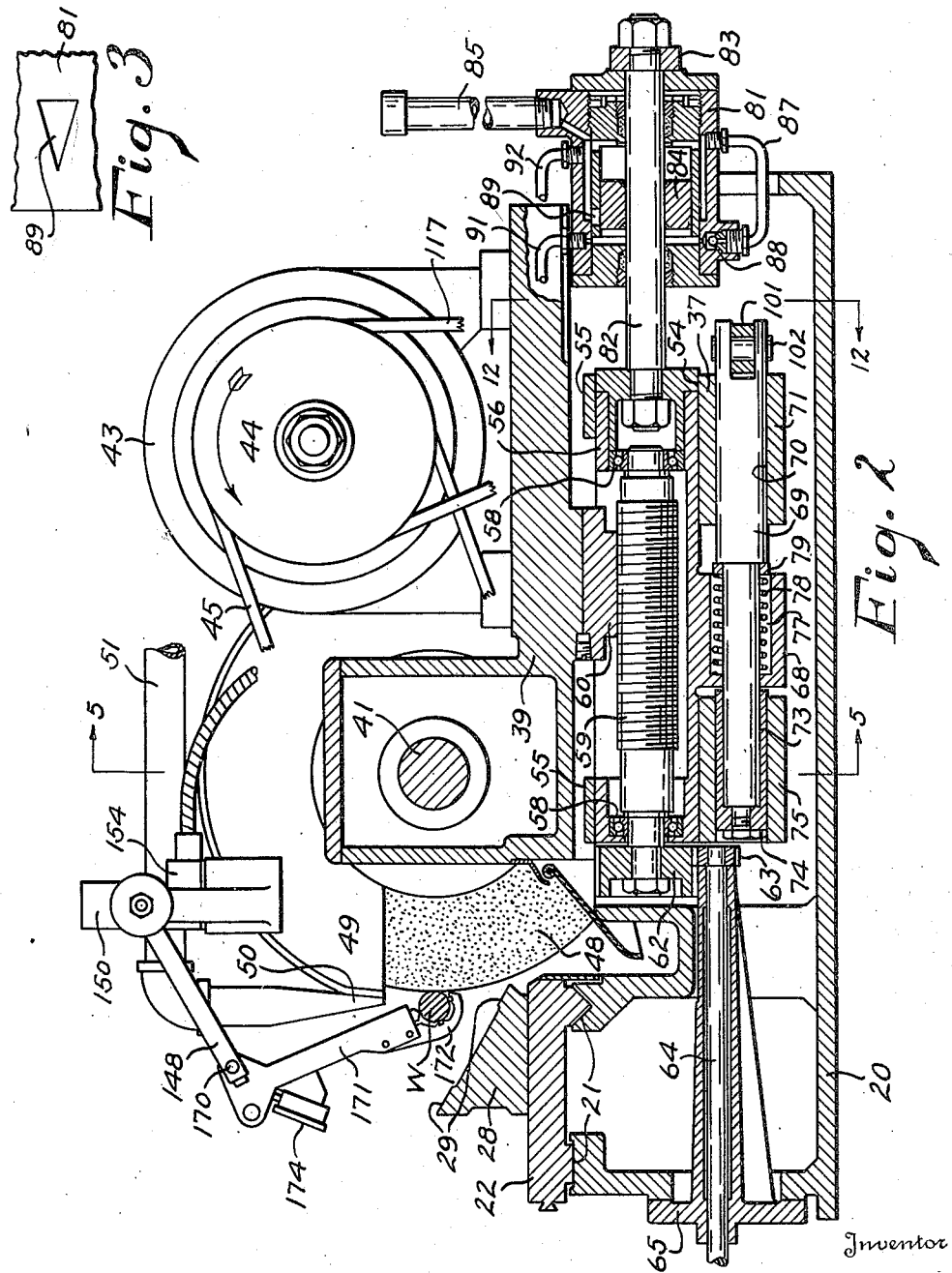

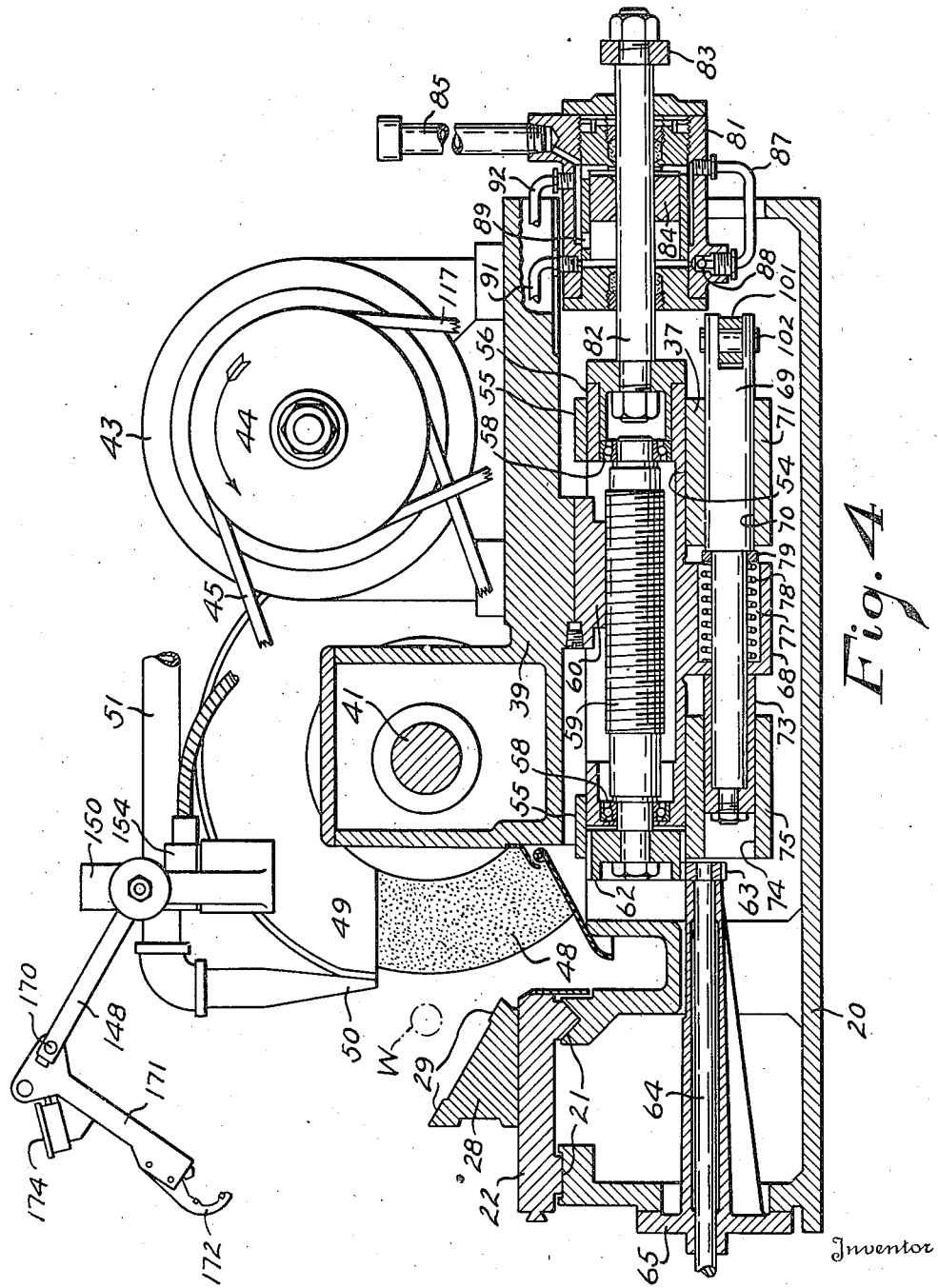

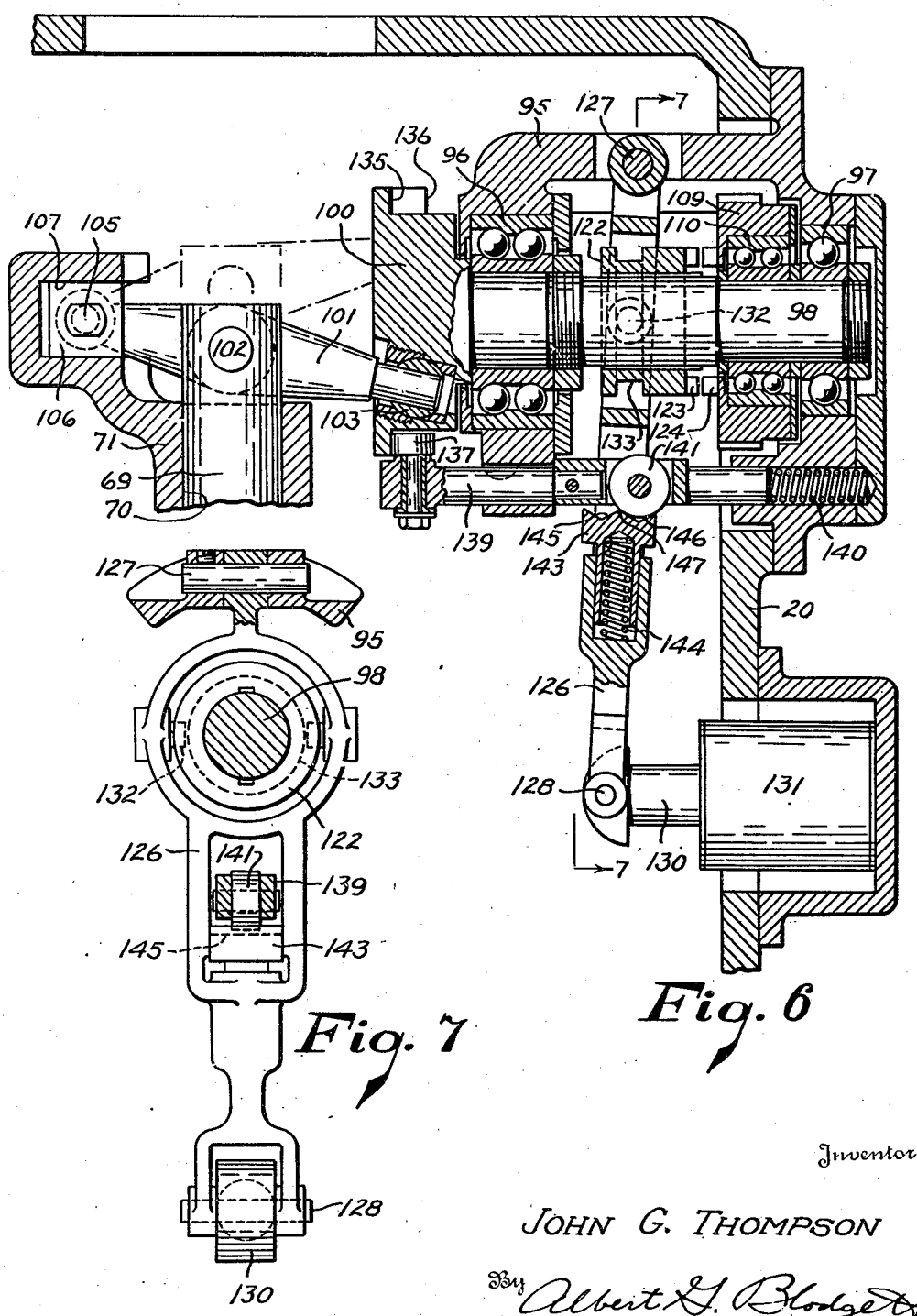

Inventor
JOHN G. THOMPSON
By Albert G. Blodgett
Attorney

Jan. 27, 1948.                    J. G. THOMPSON                    2,435,059
                                  GRINDING MACHINE
                   Filed July 20, 1945                    8 Sheets-Sheet 7
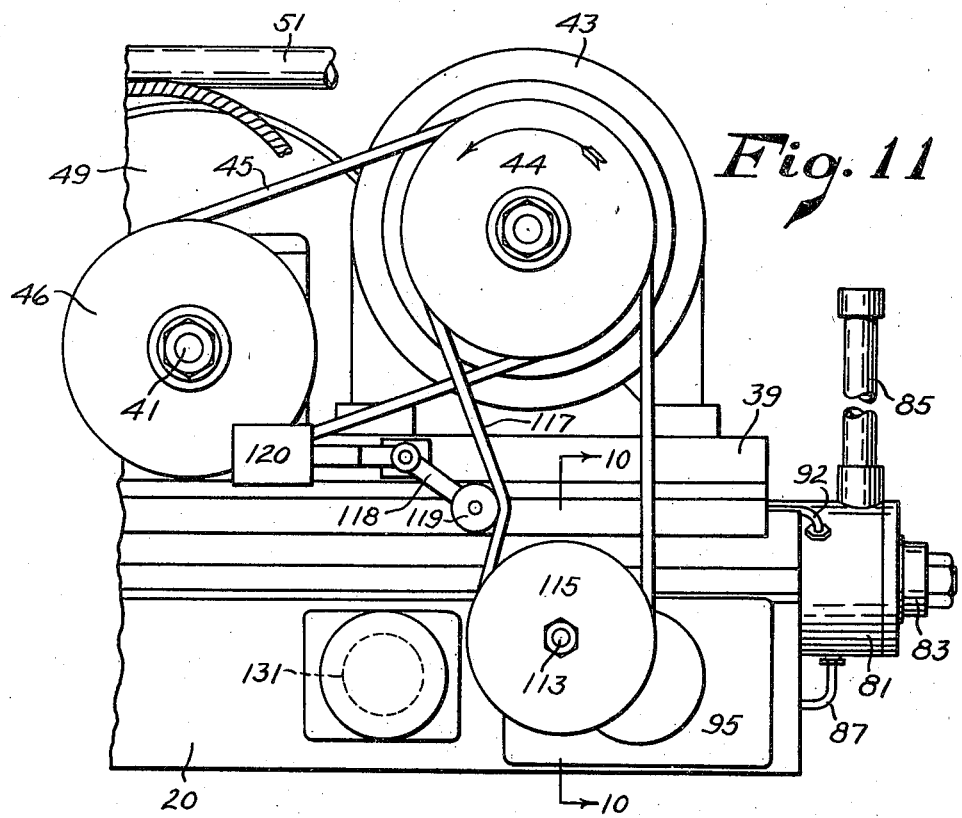
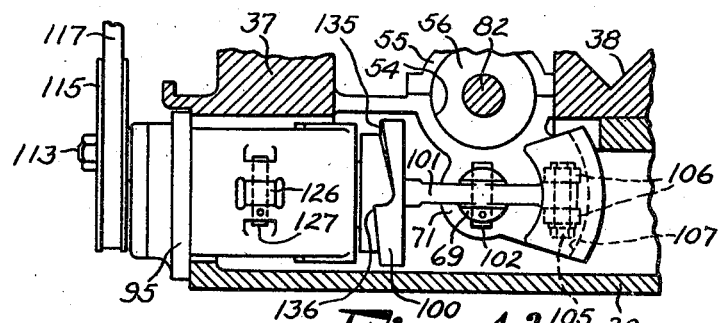
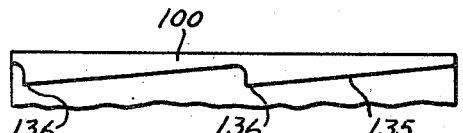
Inventor
JOHN G. THOMPSON
By Albert G. Blodgett
        Attorney Jan. 27, 1948.    J. G. THOMPSON    2,435,059
GRINDING MACHINE
Filed July 20, 1945    8 Sheets-Sheet 8

Inventor
JOHN G. THOMPSON
By Albert G. Blodgett
Attorney

Patented Jan. 27, 1948

2,435,059

UNITED STATES PATENT OFFICE 2,435,059

GRINDING MACHINE

John G. Thompson, Worcester, Mass., assignor to Arter Grinding Machine Company, Worcester, Mass., a corporation of Massachusetts Application July 20, 1945, Serial No. 606,158

11 Claims. (Cl. 51—2)

This invention relates to grinding machines, and more particularly to machines of the type having a rapidly rotating grinding wheel which is movable into contact with a work piece to grind the same to a desired size.

The usual cylindrical grinding machine includes means to support and rotate a work piece, and a wheel head arranged to support and rotate a grinding wheel. The wheel head is movable to and from the work piece. As the grinding of each work piece is completed, the operator must move the wheel head back for a substantial distance to clear the work piece, stop the flow of coolant, stop the rotation of the work piece, replace it with another work piece, start the rotation of the second work piece, and start the flow of coolant. He must then move the wheel forwardly again, using great care to avoid too sudden an engagement of the wheel with the work piece. As the grinding proceeds, the wheel must be moved forwardly very gradually and uniformly, with frequent stops to permit checking of the size of the work piece, as there is considerable danger of grinding off too much of the material. All of this is very time-consuming, and the work will occasionally be spoiled unless the operator is highly skilled. Such a machine is not well suited for the grinding of large numbers of identical work pieces, as the cost of each finished piece will be far too high.

It is accordingly one object of the invention to provide a grinding machine so constructed that highly accurate results may be obtained at high rates of production, with a minimum of attention on the part of the operator.

It is a further object of the invention to provide a grinding machine so constructed that the grinding will cease when the work piece has been properly ground, and the operator will at all times have a visual indication of the size of the work during the grinding thereof.

It is a further object of the invention to provide a grinding machine so constructed that a single device actuated by the operator will automatically control several factors in the operation of the machine.

It is a further object of the invention to provide a grinding machine so constructed that the wheel will be moved toward the work piece automatically in a new and safe manner such as to require a minimum of time for this phase of the operation.

It is a further object of the invention to provide a grinding machine which is capable of producing large numbers of accurately ground work pieces in a relatively short time even when operated by a comparatively unskilled workman.

It is a further object of the invention to provide a grinding machine having a gauge which will indicate to the operator the size of the work piece as the grinding proceeds, the construction being such that the mere removal of the gauge will prepare the machine for the removal of a finished work piece, and the mere replacement of the gauge on a subsequent work piece will start the machine in operation thereon.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a front elevation of a cylindrical grinding machine, with the work piece omitted;

Fig. 2 is a section taken on the line 2—2 of Fig. 1, showing the position of the parts at the completion of the grinding operation on a work piece;

Fig. 3 is an enlarged detail of a port in a hydraulic control device forming part of the machine;

Fig. 4 is a section similar to Fig. 2, but showing the wheel head in its retracted position;

Fig. 6 is an enlarged section taken on the line 6—6 of Fig. 5;

Fig. 7 is a section taken on the line 7—7 of Fig. 6;

Fig. 11 is a side elevation of the machine, with certain parts broken away;

Fig. 12 is a fragmentary section taken on the line 12—12 of Fig. 2;

Fig. 13 is a development of a cam forming a portion of the wheel feed mechanism;

Figure 5:
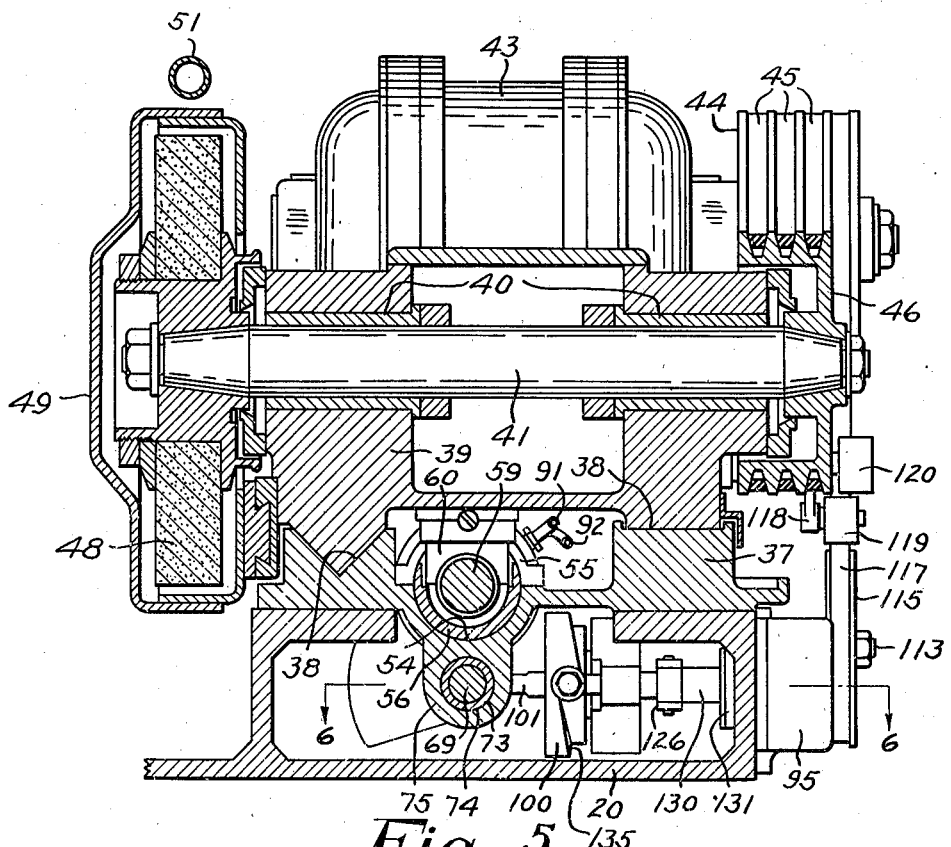
Fig. 5 is a section taken on the line 5—5 of Fig. 2.

Referring first to Figs. 1 and 2, it will be seen that the embodiment illustrated comprises a frame or bed 20 having suitable ways 21 along the front portion thereof to support a horizontally slidable table 22. This table can be moved along the ways by means of a hand wheel 24 located on the front of the bed and connected to the table by any usual and well-known mechanism (not shown). Two adjustable stops 25 are mounted on the front of the table to cooperate with a fixed stop 26 on the bed 10 to limit the movements of the table along its ways. To the top of the table there is secured an elongated block 28 having ways 29 thereon to receive a tailstock 30 with the usual tail center 31 and a headstock or work head 33 with the usual head center 34. The headstock also includes the customary revoluble stud 35 which is driven at a desired speed by an electric motor 36 connected thereto by any suitable mechanism (not shown). It will be understood that the work piece W which is to be ground will be supported on the centers 31 and 34 and rotated in a known manner by the revolving stud 35. If the work piece is not adapted for mounting on centers, the tailstock will not be required, and the work piece can be mounted in a chuck or face plate attached to the headstock in a well-known manner.

Figure 17:
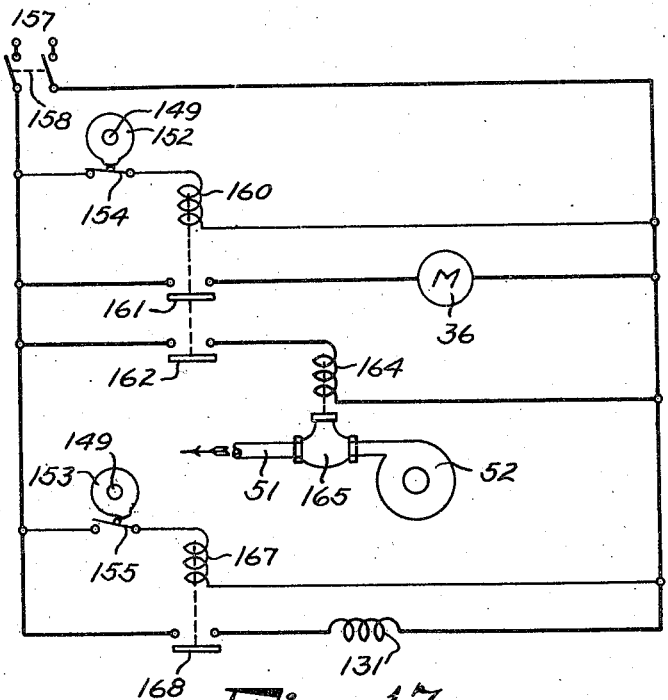
Fig. 17 is an electrical wiring diagram for certain parts used in the automatic control of the machine.

As shown in Fig. 5, the bed 20 includes a separate stationary member 37 which provides ways 38 for the support of a slidable wheel head 39 having bearings 40 in which a horizontal spindle 41 is rotatably mounted. This spindle is parallel with the axis of rotation of the work piece W, and the ways 38 extend at right angles with the said axis. An electric motor 43 is mounted on the wheel head 39 behind the spindle 41, and on the shaft of this motor there is mounted a sheave 44 which is connected by three belts 45 to a sheave 46 on one end of the spindle. The other end of the spindle carries a grinding wheel 48 which is partially enclosed by the usual wheel guard 49. At the front of this wheel there is mounted the usual downwardly directed coolant nozzle 50 which is supplied with coolant liquid through a pipe 51 leading from a suitable pump 52 (Fig. 17).

Referring now to Figs. 2 and 5, it will be seen that for the purpose of actuating the wheel head 39 in a desired manner the stationary member 37 is provided with an upwardly open semi-cylindrical or U-shaped groove 54 located directly beneath the wheel head and extending parallel with the wheel head ways 38, i. e., from front to rear. The end portions of this groove are covered by semi-circular caps 55 to form complete cylindrical bores. The groove 54 and caps 55 provide a guideway which slidably supports a plunger 56 in the form of a hollow cylinder. In its opposite end portions this plunger carries two antifriction bearings 58 which support a rotatable screw 59. The intermediate portion of the plunger is open at the top to provide room for a half-nut 60 which is fastened to the bottom of the wheel head 39 and engages the screw 59. The front end of the screw extends forwardly beyond the front bearing 58 and carries a wide-faced spur gear 62 which meshes with a narrow-faced spur pinion 63 therebeneath. This pinion is secured to the rear end of a horizontal rotatable shaft 64 supported in a bracket 65 mounted on the front of the bed 20. The shaft 64 may be turned by a suitable adjusting mechanism including a handwheel 66 (Fig. 1) at the front of the machine. This construction makes it possible to adjust the wheel head 39 relative to the plunger 56, but this adjustment will ordinarily be required only when a change is made in the size of the work piece or when the grinding wheel 48 has been dressed.

In the normal operation of the machine, the necessary back and forth movements of the wheel head 39 are imparted thereto through the medium of the plunger 56. For this purpose there is provided on the intermediate portion of the plunger a downwardly projecting lug 68 having an opening therein through which there extends a horizontal rod 69 parallel with the plunger. The rear portion of this rod is slidable in a bore 70 in a downwardly extending portion 71 of the member 37. The front portion of the rod carries a cylindrical bushing 73 which is slidable in a bore 74 in a downwardly extending portion 75 of the member 37. These bores 70 and 74 are aligned. The lug 68 is provided with a rearwardly open counterbore 77 to receive a coiled compression spring 78 which surrounds the adjacent portion of the rod 69. The rear end of this spring engages a washer 79 carried by the rod. It will be apparent that the rear end of the bushing 73 forms an abutment or shoulder which will engage the lug 68 when the rod 69 is moved rearwardly, as shown in Fig. 4, and thereby move the plunger 56 and the wheel head 39 rearwardly, retracting the wheel 48 to a considerable distance from the work piece W. It will also be apparent that when the rod 69 is moved forwardly, as shown in Fig. 2, the spring 78 will be compressed or loaded, and the pressure of the spring against the bottom of the counterbore 77 will yieldably urge the plunger 56 and the wheel head 39 forwardly, advancing the wheel 48 into engagement with the work piece.

The forward movement of the wheel head under the influence of the spring 78 is automatically controlled, and the movement is preferably rapid until the wheel has nearly reached the work piece and then relatively slow as the actual grinding operation proceeds. For this purpose I prefer to use a hydraulic dashpot comprising a stationary cylinder 81 suitably fixed to the bed 20 behind the plunger 56 and aligned therewith. A piston rod 82 extends through the cylinder and is attached to the rear end of the plunger 56. A ring or washer 83 is fastened to the rear end of the piston rod to provide an abutment or positive stop which will limit the forward movement of the plunger 56 by engaging the rear end of the cylinder 81, as shown in Fig. 2. A piston 84 is welded or otherwise secured to the piston rod within the cylinder. The interior of the cylinder is kept filled with oil or other suitable fluid under a static head produced by a vertical stand pipe 85. The front and rear ends of the cylinder are connected by a pipe 87 having a check valve 88 therein to prevent flow from front to rear. The cylinder is provided with an internal port 89 through which oil may flow from the front end of the cylinder to the rear end thereof, during the forward travel of the piston, this port being so located that it will be fully closed or cut off by the piston just before the grinding wheel 48 makes contact with the work piece. As shown in Fig. 3, the port 89 is V-shaped, with its point at the front, so that the motion of the piston will be checked smoothly and gradually. In order that the piston movement may continue after the port 89 has been closed, pipes 91 and 92 extend from the front and rear ends respectively of the cylinder 81 forwardly to a valve 93 (Fig. 1) at the front of the machine, to provide a manually controlled by-pass connection. This valve is preferably of the needle type, so that the rate of wheel advance may be adjusted as finely as desired. For clearness of illustration, the pipes 91 and 92 have been shown in Figs. 2 and 4 as displaced approximately 45 degrees from their true positions, which appear in Fig. 5.

The mechanism for actuating the slidable rod 69 will now be described. Referring to Fig. 6, it will be seen that a bracket 95 is mounted within the rear portion of the bed 20, and this bracket carries inner and outer antifriction bearings 96 and 97 respectively which support a horizontal rotatable shaft 98. This shaft extends at right angles with the rod 69, and on the inner end of the shaft there is formed an enlargement or head 100 which lies at one side of the rear end of the rod. The rod is slotted or bifurcated at its rear end to receive a transverse link 101 which is connected to the rod by a swivel pin 102. One end of the link 101 is connected to the head 100 by an eccentrically positioned ball-and-socket joint 103. The other end of the link is connected by a swivel pin 105 to a pair of blocks 106 which are slidable in a groove or guideway 107 formed in a lateral extension of the projecting portion 71. This guideway 107 is shaped as a circular arc concentric with the rod 69. With this construction, as the head 100 turns through one-half a revolution from the position shown in Fig. 6 the link 101 will slide the rod 69 rearwardly to the position indicated in broken lines. The next one-half revolution of the head will slide the rod forwardly to its original position.

Figure 10:
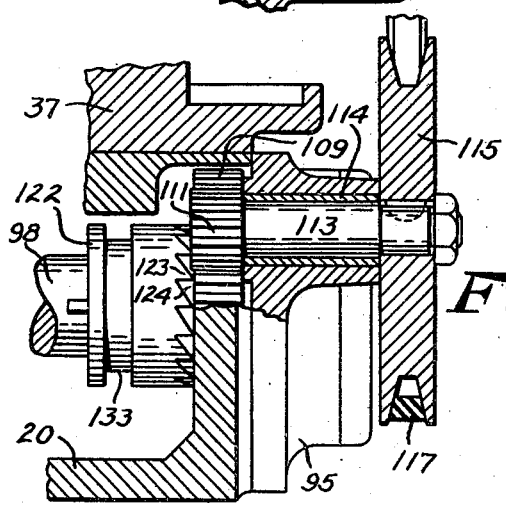
Fig. 10 is an enlarged fragmentary section taken on the line 10—10 of Fig. 11.
Figure 14:
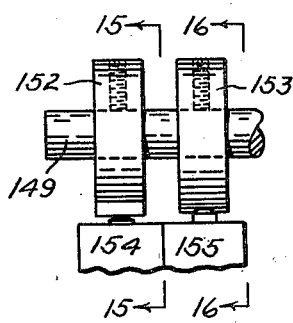
Fig. 14 is a front view of certain cams and switches.
Figure 15:
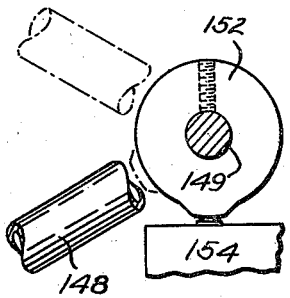
Fig. 15 is a section taken on the line 15—15 of Fig. 14.
Figure 16:
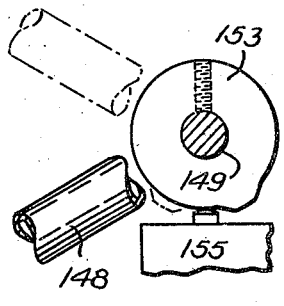
Fig. 16 is a section taken on the line 16—16 of Fig. 14.

The head 100 is preferably actuated by power derived from the motor 43 which drives the grinding wheel, as no grinding will take place during the movement of this head and the motor will accordingly be relieved of its principal load. For this purpose an annular spur gear 109 is supported on an antifriction bearing 110 on the shaft 98, at the inner side of the outer bearing 97. This gear is driven continuously by a spur pinion 111 (Fig. 10) which is mounted on the inner end of a shaft 113 supported in a bearing 114 in the bracket 95. A sheave 115 is secured to the outer end of the shaft 113, and this sheave is connected by a belt 117 to the motor sheave 44, which is provided with a fourth groove for this purpose. In order to maintain proper tension in this belt 117 despite the reciprocating movements of the wheel head 39, a lever 118 (Fig. 11) is pivotally supported on the wheel head and carries on its rear end an idler pulley 119 which engages the belt. A weight 120 is mounted on the front end of the lever to urge the pulley against the belt.

Figure 8:
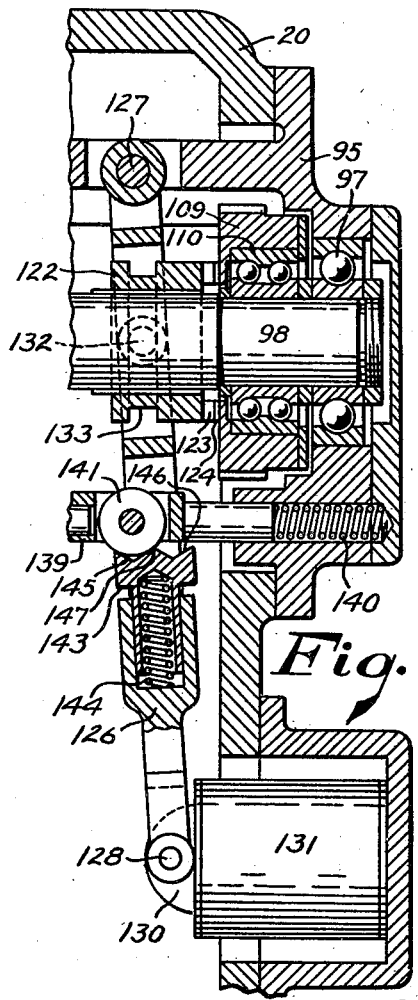
Fig. 8 is a fragmentary view similar to Fig. 6, but showing the parts in a different phase of the operation.

Suitable clutch means is provided to connect the continuously rotating gear 109 with the shaft 98 to drive the same. For this purpose a clutch collar 122 (Figs. 6 to 10) is slidably keyed to the shaft between the gear 109 and the inner bearing 96. This collar is provided with teeth 123 arranged to engage teeth 124 on the adjacent inner side of the gear 109, when the collar is moved toward the gear. In order to slide the clutch collar along the shaft, a clutch lever 126 is provided. The rear end of this lever is secured to the bracket 95 by a vertical fulcrum pin 127, and its front end is connected by a vertical pin 128 to the horizontal plunger 130 of a solenoid 131. The lever carries two opposed pins 132 which lie in a circumferential groove 133 in the clutch collar 122. This construction is such that upon energization of the solenoid 131, the plunger 130 will move the front end of the lever 126 to the right as shown in Fig. 8, engaging the clutch teeth 123 with the teeth 124, and starting the rotation of the shaft 98.

Means is provided to stop the shaft 98 automatically at the completion of each one-half revolution thereof. For this purpose a face cam 135 is formed on the periphery of the head 100, this cam having two diametrically opposite high points 136 (Fig. 13). The cam 135 engages a cam roller 137 (Fig. 6) which is carried by a rod 139 slidably supported in the bracket 95 and urged inwardly by a coiled compression spring 140 to maintain proper contact of the roller with the cam. The rod 139 also carries a roller 141 which engages a latch 143 slidably mounted in the clutch lever 126 and urged against the roller 141 by a coiled compression spring 144. This latch is provided with shallow inner and outer notches 145 and 146 located side by side and separated by a ridge 147. The distance between these notches is such that as the solenoid 131 is energized and the lever 126 is moved from the position shown in Fig. 6 to that shown in Fig. 8, the roller 141 will lie first in the notch 146 and then in the notch 145. Also, the throw of the cam 135 is such as to move the roller 141 from notch 145 to notch 146. With this construction, at each energization of the solenoid 131 the clutch lever 126 will be actuated to engage the clutch, starting the rotation of the shaft 98, and the cam 135 will move the rod 139 outwardly to compress the spring 140. At the completion of one-half revolution one of the high points 136 of the cam will pass the roller 137, and the spring 140 will force the rod 139 inwardly, carrying the clutch lever 126 with it to release the clutch and stop the rotation of the shaft. Thus successive energizations of the solenoid will result in alternate forward and rearward movements of the rod 69 and of the wheel head 39.

The movements of the wheel head 39, as well as the operation of the headstock motor 36 and the supply of coolant to the nozzle 50 are preferably controlled by a single device actuated manually by the operator of the machine. For this purpose there is provided an arm or lever 148 (Figs. 1 and 2) which projects forwardly from a horizontal shaft 149 rotatably supported in a suitable bearing structure 150 secured to the wheel guard 49. The shaft 149 carries two cams 152 and 153 which actuate two electrical switches 154 and 155 respectively. The construction is such that when the arm 148 is in its lowered position as shown in Figs. 1, 2, 15 and 16 the switch 154 will be closed and the switch 155 open, and when the arm is in its raised position as shown in Fig. 4 the switches 154 and 155 will both be open. Furthermore, as the arm 148 is moved in either direction between these two positions the switch 155 will be closed momentarily. Referring now to Fig. 17, there is shown a source 157 of electric power, provided with a main switch 158. The switch 154 is connected in series with the coil 160 of a magnetic contactor having two normally open switches 161 and 162. The switch 161 is connected in series with the headstock motor 36, and the switch 162 is connected in series with a solenoid 164 which actuates a valve 165 in the coolant pipe 51, the construction being such that when the solenoid is energized the valve will be open. The switch 155 is connected in series with the coil 167 of a magnetic contactor having a normally open switch 168, the latter being connected in series with the solenoid 131.

The arm 148 preferably carries a gauge to indicate the size of the work piece W, the construction being such that by merely placing the gauge on the work piece and removing it therefrom the grinding operation may be started and stopped. As shown in Figs. 1, 2 and 4, a transverse horizontal rod 170 is secured to the front end of the arm 148, and a gauge 171 is pivotally supported by this rod and depends therefrom. This gauge is of a well-known construction and comprises a caliper device 172 at its lower end to measure the diameter of the work piece and a pointer 173 which cooperates with a dial 174 to indicate the diameter as thus measured. The caliper device 172 is arranged to engage the work piece directly in front of the grinding wheel 48.

Figure 9:
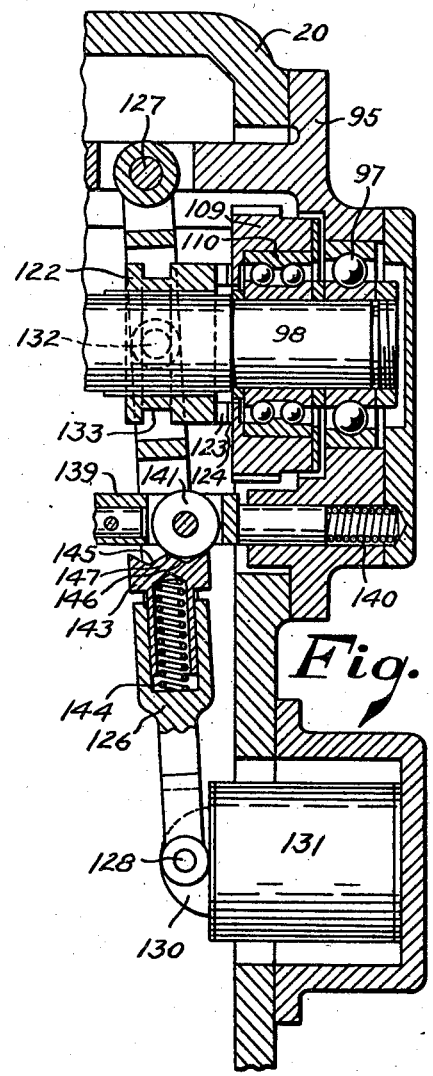
Fig. 9 is a fragmentary view similar to Fig. 8, but showing the parts in a further phase of the operation.

The operation of the invention will now be apparent from the above disclosure. The grinding wheel 48 and the gear 109 of the wheel head feeding mechanism will both be rotated continuously by the motor 43 through the medium of the belts 45 and 117. Assuming that the grinding of one work piece W has just been completed, the parts will be in the positions shown in Fig. 2, with the stop 83 in contact with the rear end of the cylinder 81. At this time the pointer 173 associated with the dial 174 will indicate that the work piece has been ground to the proper size. Noting this, the operator will release the caliper device 172 from the work piece and raise the arm 148, as shown in Fig. 4. During this movement of the arm 148, the cam 152 will open the switch 154, and the cam 153 will momentarily close the switch 155. Opening the switch 154 will de-energize the coil 160, opening the switches 161 and 162. Opening the switch 161 will de-energize the headstock motor 36, so that the work piece will stop rotating. Opening the switch 162 will de-energize the solenoid 164, so that the valve 165 will close and shut off the flow of coolant to the nozzle 50. The momentary closing of the switch 155 will energize the coil 167, close the switch 168 and thereby energize the solenoid 131 momentarily. This solenoid will attract the plunger 130 and move the clutch lever 126 outwardly from the position shown in Fig. 6 to the position shown in Fig. 8, thus sliding the clutch collar 122 outwardly to bring the teeth 123 into engagement with the revolving teeth 124 on the gear 109. During this movement of the clutch lever, the latch 143 will yield slightly against the spring 144 so that the latch ridge 147 may pass the roller 141 which, at the end of this movement, will rest in the notch 145. As the clutch engages, the shaft 98 will start to revolve and the cam 135 will force the rod 139 outwardly against the spring 140, moving the roller 141 into the notch 146 as shown in Fig. 9. At the completion of one-half a revolution, one of the high points 136 will pass beneath the cam roller 137, whereupon the spring 140 will immediately snap the rod 139 inwardly. Since the solenoid 131 was energized only momentarily, the clutch lever 126 is free to move inwardly, and it will be moved inwardly by reason of the engagement of the roller 141 within the notch 146, thus releasing the clutch and stopping the rotation of the shaft 98. During this one-half revolution of the shaft and its head 100, the link 101 will be swung around to the position indicated by the broken lines in Fig. 6, and the rod 69 will be moved rearwardly with a substantially simple harmonic motion from the position shown in Fig. 2 to that shown in Fig. 4. During this rearward movement of the rod 69, the rear end of the bushing 73 will make contact with the lug 68 and cause the plunger 56, the screw 59, the wheel head 39, the piston rod 82 and the piston 84 to move rearwardly. The oil in the cylinder 81 will not appreciably resist this movement, as it is free to flow forwardly through the bypass 87 and through the check valve 88. At the completion of the wheel head travel, the wheel 48 will be well clear of the work piece W, which will thereupon be removed by the operator and replaced by a new work piece.

As soon as the new work piece has been placed on the work centers 31 and 34, the operator will swing the gauge arm 148 downwardly and place the caliper device 172 on the new work piece. During this movement the cam 152 will close the switch 154, and the cam 153 will momentarily close the switch 155. Closing the switch 154 will energize the coil 160, thereby closing the switches 161 and 162, and energizing the headstock motor 36 and the valve solenoid 164. Consequently the work piece will start to revolve, and the valve 165 will open to permit flow of coolant from the pump 52 to the nozzle 50. The momentary closing of the switch 155 will energize the coil 167, close the switch 168, and thereby energize the solenoid 131 momentarily. This will swing the clutch lever 126 outwardly, engaging the clutch, and causing the shaft 98 to make one-half a revolution, whereupon the combined action of the cam 135 and the rod 139 will disengage the clutch in the same manner as described above. During this one-half revolution of the shaft head 100, the link 101 will slide the rod 69 forwardly with a substantially simple harmonic motion to the position shown in Fig. 2, compressing the spring 78 and yieldably urging the plunger 56 and the wheel slide 39 forwardly. This forward movement of the wheel slide will be rapid at first and nearly in step with the movement of the rod 69, since oil can flow freely through the port 89 and there will accordingly be little resistance to the movement of the piston 84. However, as the piston moves forwardly over the V-shaped port 89 and gradually restricts the flow, the wheel slide will be decelerated by the increasing pressure of the oil in front of the piston, and just before the grinding wheel 48 makes contact with the work piece the piston will close the port 89 completely. From then on the forward speed of the wheel slide will depend upon the adjustment of the needle valve 93 at the front of the machine, since the only path for the escape of oil from in front of the piston 84 is through the pipe 91, valve 93, and pipe 92. Consequently the operator can control the speed of grinding by adjusting the valve 93, but once this adjustment has been properly made it will seldom be necessary to change it. The gauge needle 173 will indicate the size of the work piece, and when the stop 83 reaches the rear end of the cylinder 81 (as shown in Fig. 2) the grinding will cease and the needle will indicate the correct finished size for the work piece. Noting this, the operator will remove the gauge from the work piece so that the cycle may be repeated on a subsequent work piece. When the grinding wheel 48 has been dressed, which will of course reduce its diameter slightly, the operator will readjust the wheel slide 39 relative to the plunger 56 by turning the screw 59 through the medium of hand wheel 66, the shaft 64, the pinion 63, and the gear 62. This will make it possible for the machine to continue to grind work pieces of the correct finished size.

It will be seen that the invention is particularly adapted for the grinding of large numbers of identical pieces at high rates of production. Since the operator has very little to do except to insert and remove the work pieces, comparatively little skill is required. Furthermore, the forward and rearward movements of the wheel head are under such automatic control that there is little danger of spoiled work.

Having thus described my invention, what I claim as new and desire to secure by Letters Patent is:

1. A grinding machine comprising means to support a work piece, a wheel head movable toward and from the work piece, mechanism to move the wheel head, a grinding wheel carried by the wheel head, a motor connected to the grinding wheel to drive the same, means including a clutch to connect the motor with the said mechanism to move the wheel head, a gauge arranged to engage the work piece and indicate the size thereof, means supporting the gauge for movement into and out of engagement with the work piece, and means to control the said clutch in response to the movements of the gauge.

2. A grinding machine comprising a work head arranged to support a work piece for rotation, driving means associated with the work head to rotate the work piece, a wheel head movable toward and from the work piece, mechanism to move the wheel head, a grinding wheel carried by the wheel head, a motor connected to the grinding wheel to drive the same, means including a clutch to connect the motor with the said mechanism to move the wheel head, a gauge arranged to engage the work piece and indicate the diameter thereof, means supporting the gauge for movement into and out of engagement with the work piece, and control means responsive to the movements of the gauge and arranged to control both the said driving means for the work piece and the said clutch.

3. A grinding machine comprising means to support a work piece, a wheel head movable toward and from the work piece, a grinding wheel carried by the wheel head, power actuated means to provide a force yieldably urging the wheel head toward the work piece, a stationary cylinder filled with fluid, a piston slidable in the cylinder and connected to the wheel head, the cylinder having a port through which fluid may flow from one side of the piston to the other as the wheel head moves toward the work piece, the port being in a position to be closed by the piston shortly before the grinding wheel engages the work piece, and a separate manually controllable by-pass through which fluid may continue to flow from one side of the piston to the other as the grinding of the work piece proceeds.

4. A grinding machine comprising means to support a work piece, a wheel head movable toward and from the work piece, a grinding wheel carried by the wheel head, power actuated means arranged alternately to apply a force positively moving the wheel head away from the work piece and to apply a force yieldably urging the wheel head toward the work piece, and a hydraulic dashpot arranged to control the movement of the wheel head in response to the last-mentioned force.

5. A grinding machine comprising means to support a work piece, a wheel head movable toward and from the work piece, a grinding wheel carried by the wheel head, a slidable element connected to the wheel head, power actuated means to slide the said element, a solenoid, and control means for the power actuated means responsive to energization of the solenoid and so arranged that upon successive momentary energizations of the solenoid the said element will be moved first in one direction and then in the opposite direction.

6. A grinding machine comprising means to support a work piece, a wheel head movable toward and from the work piece, a grinding wheel carried by the wheel head, a slidable element connected to the wheel head, a rotatable element connected to the slidable element to move the same from one end of its stroke to the other with a substantially simple harmonic motion upon successive one-half revolutions of the rotatable element, a continuously rotating driving element, a clutch to connect the said driving element to the rotatable element to actuate the same, means to engage the clutch, and means to disengage the clutch automatically at the completion of each one-half revolution of the rotatable element.

7. A grinding machine comprising means to support a work piece, a wheel head movable toward and from the work piece, a grinding wheel carried by the wheel head, a slidable element connected to the wheel head, a rotatable element connected to the slidable element to move the same from one end of its stroke to the other with a substantially simple harmonic motion upon successive one-half revolutions of the rotatable element, a continuously rotating driving element, a clutch to connect the said driving element to the rotatable element to actuate the same, means to engage the clutch, a cam on the rotatable element, and means actuated by the cam and effective to disengage the clutch automatically at the completion of each one-half revolution of the rotatable element.

8. A grinding machine comprising means to support a work piece, a wheel head movable toward and from the work piece, a grinding wheel carried by the wheel head, a slidable rod connected to the wheel head, a rotatable element mounted adjacent the rod with its axis substantially perpendicular to the rod, a link pivotally connected to the rod and extending transversely thereof, means to guide one end of the link in an arcuate path concentric with the rod, means providing a ball-and-socket joint connecting the other end of the link to the rotatable element at a point spaced from the axis thereof, and power actuated means to turn the rotatable element through successive one-half revolutions and thereby slide the rod from one end of its stroke to the other.

9. A grinding machine comprising means to support a work piece, a wheel head movable toward and from the work piece, a grinding wheel carried by the wheel head, a slidable element connected to the wheel head, a rotatable element connected to the slidable element to move the same from one end of its stroke to the other with a substantially simple harmonic motion upon successive one-half revolutions of the rotatable element, a continuously rotating driving element, a clutch to connect the said driving element to the rotatable element to actuate the same, a lever to engage and disengage the clutch, a solenoid to actuate the lever for clutch engagement, a rod slidably mounted adjacent the lever and extending transversely thereof, a cam on the rotatable element arranged to move the rod in one direction once at each one-half revolution of the cam, a spring urging the rod in the other direction, a latch on the clutch lever, and means on the rod engaging the latch and arranged to move the lever to disengage the clutch when the rod slides in response to the force of the spring.

10. A grinding machine comprising a work head arranged to support a work piece for rotation, driving means associated with the work head to rotate the work piece, a wheel head movable toward and from the work piece along a path at right angles with the axis of the work piece, mechanism to move the wheel head along said path, a grinding wheel carried by the wheel head, a motor connected to the grinding wheel to drive the same, and means including a clutch to connect the motor with the said mechanism to move the wheel head.

11. A grinding machine comprising means to support a work piece, a wheel head movable toward and from the work piece, a grinding wheel carried by the wheel head, a spring arranged to apply a force yieldably urging the wheel head toward the work piece, power actuated means arranged alternately to apply a force positively moving the wheel head away from the work piece and to load the spring so that the spring will move the wheel head toward the work piece, and a hydraulic dashpot arranged to control the movement of the wheel head in response to the force of the spring.

JOHN G. THOMPSON.

REFERENCES CITED

The following references are of record in the file of this patent:

UNITED STATES PATENTS

| Number | Name | Date |
|---|---|---|
| 1,522,465 | Kimmel | Jan. 6, 1925 |
| 1,026,389 | Garvin et al. | May 14, 1912 |
| 1,873,152 | Plantinga | Aug. 23, 1932 |
| 2,101,790 | Cole et al. | Dec. 7, 1937 |
| 2,190,134 | Garside et al. | Feb. 13, 1940 |
| 675,936 | Dawson | June 11, 1901 |
| 2,003,334 | Belden et al. | June 4, 1935 |
| 2,267,391 | Astrowski | Dec. 23, 1941 |
| 1,858,222 | Silven | May 10, 1932 |